(12) United States Patent
Anderson

(10) Patent No.: US 6,820,889 B1
(45) Date of Patent: Nov. 23, 2004

(54) APPARATUS FOR TRANSPORTING MANUFACTURED HOUSING

(76) Inventor: Ronald Anderson, 115 W. Winslow, Upland, CA (US) 91786

( * ) Notice: Subject to any disclaimer, the term of this patent is extended or adjusted under 35 U.S.C. 154(b) by 0 days.

(21) Appl. No.: 10/634,621

(22) Filed: Aug. 4, 2003

(51) Int. Cl.$^7$ ................................................. B60D 1/01
(52) U.S. Cl. ........................ 280/504; 280/475; 280/512
(58) Field of Search ................................ 280/475, 510, 280/515, 406.2, 424, 504, 508, 512

(56) References Cited

U.S. PATENT DOCUMENTS

| | | | | |
|---|---|---|---|---|
| 2,692,149 A | * | 10/1954 | Wilcox | 280/476.1 |
| 3,486,768 A | * | 12/1969 | Masser | 280/476.1 |
| 3,627,352 A | * | 12/1971 | Canole | 280/475 |
| 3,797,863 A | * | 3/1974 | Cunha | 280/476.1 |
| 4,415,182 A | * | 11/1983 | Smith-Williams et al. | 280/763.1 |
| 5,346,245 A | * | 9/1994 | Budrow et al. | 280/655 |
| 6,158,760 A | * | 12/2000 | Kiss | 280/491.5 |
| 6,511,250 B2 | | 1/2003 | Lindsay | |

* cited by examiner

Primary Examiner—Daniel G. DePumpo
(74) Attorney, Agent, or Firm—James E. Brunton

(57) ABSTRACT

A hitch assembly that is specially designed for transporting large and heavy manufactured housing units. The hitch assembly is of a one piece unitary construction that includes angularly extending sides that define an included angle of between approximate 50 and 60 degrees so that it can be interconnected with the structural members of standard, prior art hitch assemblies, which also define an included angle of between approximately 50 and 60 degrees.

16 Claims, 4 Drawing Sheets

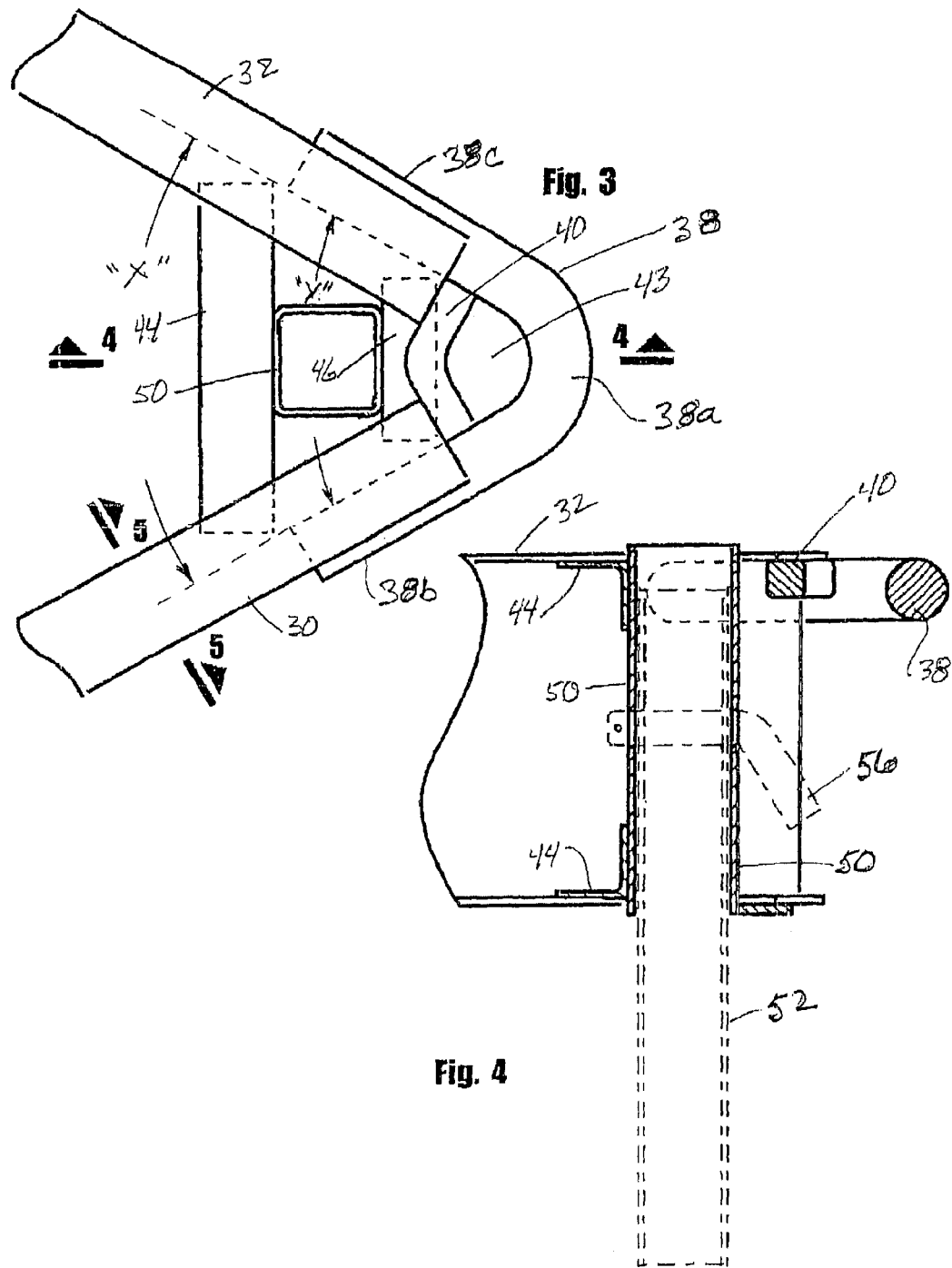

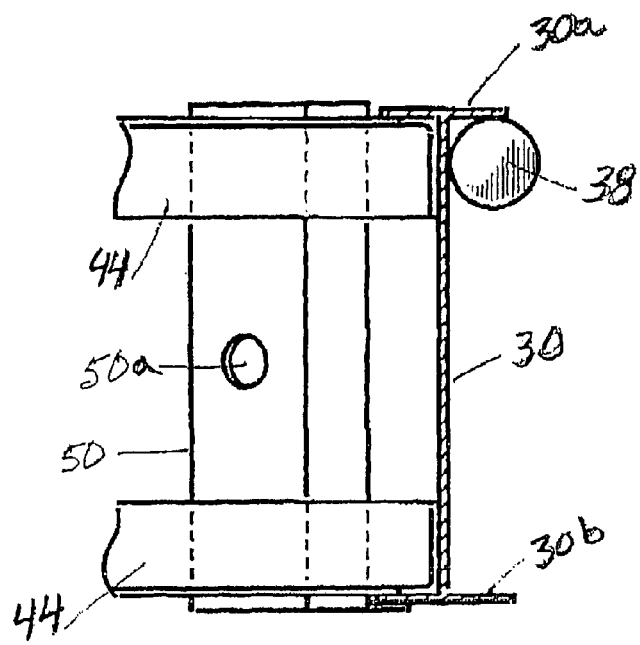
Fig. 5
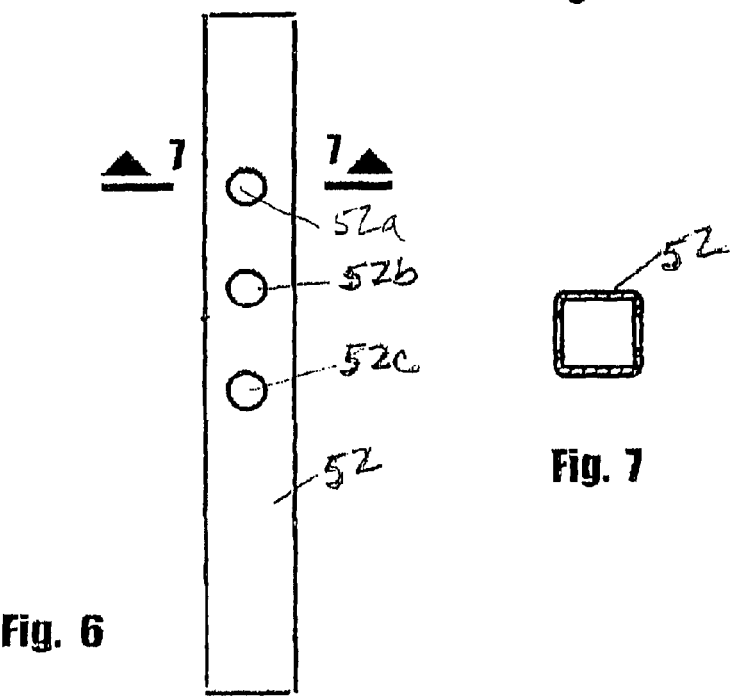
Fig. 6
Fig. 7

APPARATUS FOR TRANSPORTING MANUFACTURED HOUSING

BACKGROUND OF THE INVENTION

1. Field of the Invention

The present invention relates generally to transporter systems for transporting factory built manufactured homes. More particularly, the invention concerns the transport of chassis systems that are a permanent part of factory-built manufactured homes.

2. Discussion of the Prior Art

In recent years factory built manufactured homes have become quite popular. These manufactured homes are typically quite large and comprise very heavy interconnected sections. For example factory built manufactured homes are typically constructed as single width homes, double width homes and triple width homes, some having a length in excess of 70 feet. As a general rule, the single width homes are about 12–16 feet wide, the double width homes are about 24–32 feet wide and the triple width homes are about 38–48 feet wide.

After a portion of a manufactured home has been constructed at the factory, it is generally transported by truck over public roads to its permanent homesite. These home sections are typically quite large and can have and a width of on the order of 16 feet and a length in excess of 70 feet.

In the past, the coupler or hitch used on chassis systems for manufactured housing units consisted of a mobile home hitch of standard construction that was designed to connect to a 2 5/16 inch ball on the transport trucks. However, for the past several years, manufactured housing units have become so heavy that the standard type of mobile home hitch and screw jack is no longer practical. The alternative has been to use a pintle hook and heavy-duty jack stand. However this approach has proved to be very expensive and generally too costly for the industry. As will be better understood from the discussion that follows, the apparatus of the present invention comprises a hybrid attachment for use in the manufactured housing industry which is both inexpensive and meets the capacity requirements for heavier manufactured housing units.

Little work has been done in the past in attempting to design a suitable hitch for use in connection with trailers for transporting large and heavy manufactured housing units. However, U.S. Pat. No. 6,511,250 issued to Lindsay discloses a specialized type of hitch mechanism for use in connection with large transport carrier frames. More particularly this patent discloses a quick release mechanism for a detachable hitch assembly which comprises at least two receiving portions at tached to a cross member of a transport carrier frame in a spaced-apart relationship and corresponding mating portions attached to a detachable hitch assembly.

SUMMARY OF THE INVENTION

It is an object of the present invention to provide a new and improved hitch assembly that is specially designed for transporting large and heavy manufactured housing units.

Another object of the invention is to provide a novel hitch assembly of the aforementioned character that is inexpensive and meets the capacity requirements for moving heavy manufactured housing units.

Another object of the invention is to provide a hitch assembly as described in the preceding paragraphs that is of a simple, but highly rugged construction.

Another object of the invention is to provide a hitch assembly of the class described that is easy to install on manufactured housing units of standard design. More particularly, the uniquely configured connector member of the hitch assembly of the invention, which is of a one piece unitary construction, includes angularly extending sides that define an included angle of approximately 50 or 60 degrees so that it can be interconnected with the structural members of standard, prior art hitch assemblies, which define a similar included angle.

BRIEF DESCRIPTION OF THE DRAWINGS

FIG. 3 is a top plan view of a portion of the hitch assembly.

FIG. 4 is a cross-sectional view taken along lines 4—4 of FIG. 3.

FIG. 5 is a cross-sectional view taken along lines 5—5 of FIG. 4.

FIG. 6 is a side-elevational view of the inner portion of the support tube assembly of the apparatus of the invention.

FIG. 7 is a cross-sectional view taken along lines 7—7 of FIG. 6.

DISCUSSION OF THE INVENTION

Figure 1:
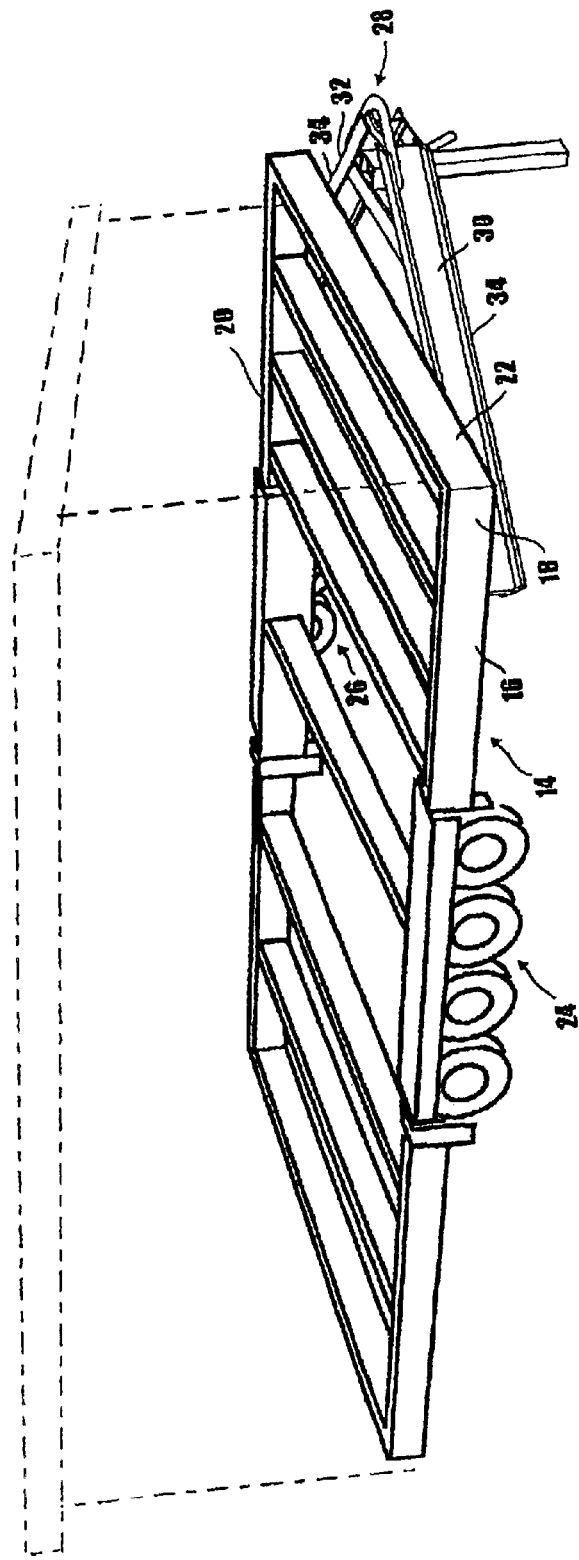
FIG. 1 is a generally perspective view of a manufactured housing chassis having the yoke or hitch assembly of the invention affixed thereto.

Referring to the drawings and particularly to FIGS. 1 through 4, one form of the chassis of the present invention is there illustrated and generally designated by the numeral 14. As indicated by the dotted lines in FIG. 1, the frame portion 16 of the chassis 14 is specially constructed for transporting and supporting manufactured housing units which are a permanent part of the total structure and are of the general character illustrated by the dotted lines. The frame portion 16 includes a pair of a longitudinally extending, substantially parallel structural side members 18 and 20 and a transversally extending structural member(s) 22 that interconnects side members 18 and 20. A first set of wheels 24 is connected to side member 18 and a second set of wheels 26 is connected to side member 20. The novel hitch assembly of the invention, which is generally designated in the drawings by the numeral 28, is connected to transversally extending structural member 22 in the manner illustrated in FIG. 1.

Figure 2:
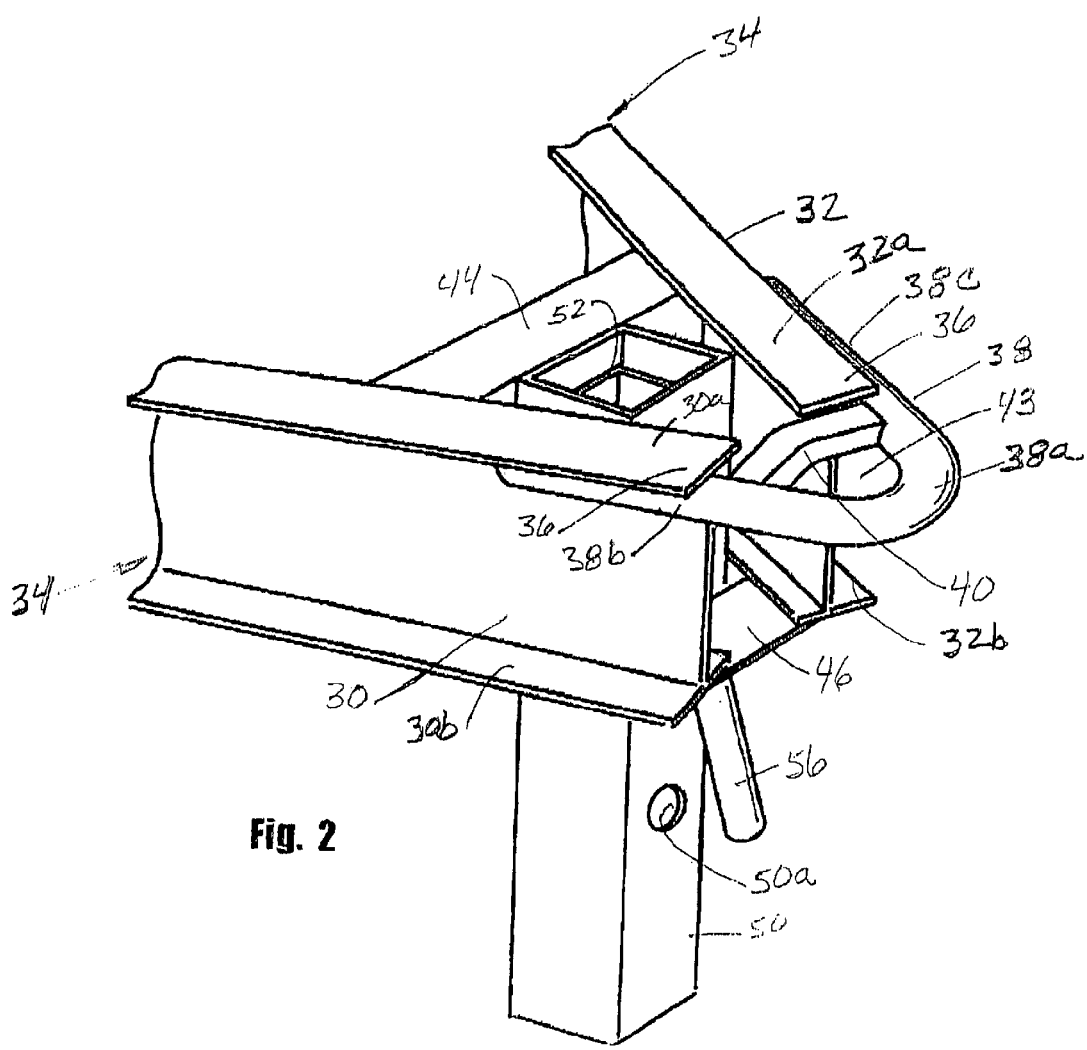
FIG. 2 is an enlarged, generally perspective view of one form of the hitch assembly of the invention.

As best seen in FIGS. 1 and 2, hitch assembly 28 includes first and second angularly outwardly extending structural members 30 and 32. Each of these structural members, which is generally "I" shaped in cross section, has a first end portion 34 that is connected to transversally extending structural member 22 as by welding and a second end portion 36. As is generally standard in the industry, structural members 30 and 32 define therebetween an included angle "x" of approximately 60 degrees. It should be noted, however, that in some cases the structural members of certain prior art chassis define an angle of approximately 50 degrees.

Connected to end portions 36 of the outwardly extending structural members 30 and 32, as by welding, is a generally "V" shaped connector 38 that is formed in a one-piece unitary construction from a length of steel rod. As best seen in FIG. 3, connector 38 includes an apex portion 38a and first and second legs 38b and 38c, which hee define therebetween an included angle "y" of approximately 60 degrees. As shown in FIGS. 2, 3 and 5, because the legs of connector member 38 extend rearwardly at the same angle as the structural members 30 and 32 extend forwardly, the connector member can be fitted snugly between structural members 30 and 32 and can be positioned and then welded in place to the central portion of the flanges and also to the upper flange portions 30a and 32a of the flanges.

Also forming a part of hitch assembly 28 is a generally lunette shaped element 40 that is connected to and spans first and second legs 38b and 38c of connector 38. In the present form of the invention the generally lunette shaped element comprises a generally cylindrically shaped bent rod of the configuration best seen in FIGS. 2 and 3. In some instances the lunette-shaped element can comprise a generally square-shaped bent rod. As shown in FIGS. 2 and 3, element 40 cooperates with apex 38a of connector 38 to form a semi-round receiving eye 43 which is strategically sized to receive a conventional pintal hook provided on the towing vehicle.

In the present form of the invention, the hitch assembly 28 also includes first and second vertically spaced apart cross-braces 44 that are connected to and span structural members 30 and 32 at a first location rearwardly of lunette shaped member 40. As indicated in FIG. 4, cross-braces 44 here comprises steel angle mounts of conventional construction. A second, flat steel cross-brace 46 is also connected to and spans the lower flanges 30b and 32b of structural members 30 and 32 at a second location spaced apart from the first location and proximate the first ends 36 of the structural members.

Comprising a part of the hitch support standard of the apparatus of the invention for supporting the elevated forward end of the transport trailer is a first elongated tube 50 that is generally rectangular in cross section. Tube 50 is disposed between and is interconnected with cross braces 44 and 46. This strategic positioning of elongated tube 50 between the cross-braces significantly adds to the structural integrity of the hitch assembly. As indicated in FIG. 2, first elongated tube 50 is provided with a through bore 50a. As shown by the dotted lines in FIG. 4, a second elongated tube 52, which is also rectangular in cross section, is telescopically received within said elongated tube 50 and is slidably movable therewith into several positions. For a reason presently to be described, elongated tube 52 is provided with a plurality of spaced apart through bores 52a, 52b and 52c (see FIGS. 6 and 7). Tubes 50 and 52 are shown in the drawings as being square in cross section but it is to be understood that the tubes could be round or rectangular in cross section.

As best seen in FIG. 4, a locking pin 56 is telescopically receivable within the bores formed in first and second elongated tubes 50 and 52 when a selected aperture in tube 52 is brought into alignment with aperture 50a provided in tube 50. In the present form of the invention locking pin 50 comprises a generally cylindrically shaped bent rod of the configuration shown in FIG. 4.

With the construction shown in the drawings, it is apparent that tube 52 can be moved telescopically upwardly and downwardly within tube 50 to selectively align a selected one of the apertures 52a, 52b and 52c provided in inner tube 52 and with aperture 50a provided in the outer tube 50. In this way the elevation of the forward end of the trailer unit can readily be adjusted.

Having now described the invention in detail in accordance with the requirements of the patent statutes, those skilled in this art will have no difficulty in making changes and modifications in the individual parts or their relative assembly in order to meet specific requirements or conditions. Such changes and modifications may be made without departing from the scope and spirit of the invention, as set forth in the following claims.

I claim:

1. In combination, a permanent chassis for transporting manufactured housing units and a hitch assembly for interconnecting the chassis with a vehicle for pulling the chassis, said chassis comprising a support frame for supporting the manufactured housing units that includes a transversally extending structural member and a pair of angularly outwardly extending structural members connected to said transversally extending structural member, said hitch assembly comprising:

(a) a generally "V" shaped connector formed in a one piece unitary construction connected to said pair of angularly outwardly extending connector members, said connector having an apex and first and second legs;

(b) a generally lunette shaped element connected to and spanning said first and second legs of said connector and cooperating with said apex of said connector to form an eye assembly;

(c) a first cross brace connected to and spanning said pair of outwardly extending structural members at a first location;

(d) a second cross brace connected to and spanning said pair of outwardly extending structural members at a second location spaced apart from said first location;

(e) a first elongated tube disposed between and interconnected with said first and second cross braces, said first elongated tube having a bore therethrough;

(f) a second elongated tube telescopically received within said first elongated tube, said second elongated tube having a plurality of spaced apart bores there through; and (g) a locking pin telescopically receivable within said bores formed in said first and second elongated tubes.

2. The combination as defined in claim 1 in which said angularly outwardly extending structural members define an included angle there between of approximately 50 and 60 degrees and in which said first and second legs of said connector member define an included angle there between of approximately 50 and 60 degrees.

3. The combination as defined in claim 1 in which said first and second elongated tubes are generally rectangular shaped in cross section.

4. The combination as defined in claim 1 in which said first cross brace comprises an angle bracket.

5. The combination as defined in claim 1 in which said connector member comprises a generally cylindrically shaped bent rod.

6. The combination as defined in claim 5 in which said generally lunette shaped element comprises a generally cylindrically shaped bent rod.

7. In combination, a permanent chassis for transporting a manufactured housing unit and a hitch assembly for interconnecting the chassis with a vehicle for pulling the chassis, said chassis comprising a support frame having a transversally extending structural member and a pair of outwardly extending structural members connected to said transversally extending structural member, said pair of outwardly extending structural members defining therebetween an included angle of approximately 50 and 60 degrees, said hitch assembly comprising:

(a) a generally "V" shaped connector formed in a one piece unitary construction connected to said pair of outwardly extending connector members, said connector having an apex and first and second legs defining there between an included angle of approximately 50 and 60 degrees;

(b) a lunette element connected to and spanning said first and second legs and cooperating with said apex of said connector to form an eye assembly;

(c) an angle bracket connected to and spanning said pair of outwardly extending structural members at a first location;

(d) a generally planar, flat brace connected to and spanning said pair of outwardly extending structural members at a second location spaced apart from said first location;

(e) a first elongated, generally square tube disposed between and interconnected with said angle bracket and said flat brace, said first elongated tube having a bore there through;

(f) a second elongated generally square tube telescopically received within said first elongated generally square tube, said second elongated tube having a plurality of spaced apart bores there through; and (g) a locking pin telescopically receivable within said bores formed in said first and second elongated tubes.

8. The combination as defined in claim 7 in which said connector member comprises a generally cylindrically shaped bent rod.

9. The combination as defined in claim 7 in which said generally lunette shaped element comprises a generally cylindrically shaped bent rod.

10. The combination as defined in claim 7, further including a second angle bracket connected to and spanning said pair of outwardly extending structural members.

11. A permanent chassis for transporting a manufactured housing unit, including a support frame having a transversally extending structural member; a first angularly outwardly extending structural member having a first end connected to said transversally extending structural member; and a second angularly outwardly extending structural member having a first end connected to said transversally extending structural member and a second end, the improvement comprising a hitch assembly for interconnecting the chassis with a vehicle for pulling the chassis, said hitch assembly comprising:

(a) a generally "V" shaped connector formed in a one piece unitary construction connected to said pair of outwardly extending connector members proximate said second ends thereof, said connector having an apex and first and second legs defining there between an included angle of approximately 50 and 60 degrees;

(b) a lunette element connected to and spanning said first and second legs and cooperating with said apex of said connector to form a semiround receiving eye assembly;

(c) first and second angle brackets connected to and spanning said pair of outwardly extending structural members at a first location intermediate said first and second ends thereof;

(d) a substantially planar brace connected to and spanning said pair of outwardly extending structural members at a second location spaced apart from said first location;

(e) a first elongated, generally square tube disposed between and interconnected with said first and second angle brackets, said first elongated tube having a bore therethrough;

(f) a second elongated generally square tube telescopically received within said first elongated generally square tube, said second elongated tube having a plurality of spaced apart bores therethrough, a selected one of said plurality of spaced apart bores being alignable with said bore in said first elongated generally square tube; and (g) a locking pin telescopically receivable within said bore formed in said first elongated tube and also within a selected one of said plurality of spaced apart bores formed in said second elongated generally square tube.

12. The chassis as defined in claim 11 in which said first and second angularly outwardly extending structural members define an included angle therebetween of approximately 50 and 60 degrees.

13. The chassis as defined in claim 11 in which said first and second angularly outwardly extending structural members are generally "I" shaped in cross section, each having upper and lower spaced apart flanges.

14. The chassis as defined in claim a 13 in which said generally "V" shaped connector is interconnected with said upper flanges of said first and second angularly outwardly extending structural members.

15. The chassis as defined in claim 13 in which said connector member comprises a generally cylindrically shaped bent rod.

16. The chassis as defined in claim 15 in which said generally lunette shaped element comprises a generally cylindrically shaped bent rod.

* * * * *